United States Patent
Kinnaird et al.

(10) Patent No.: US 11,255,243 B1
(45) Date of Patent: Feb. 22, 2022

(54) DUAL PURPOSE DOSER SPRING

(71) Applicant: Faurecia Emissions Control Technologies, USA, LLC, Columbus, IN (US)

(72) Inventors: Edward Kinnaird, Columbus, IN (US); John Rohde, Columbus, IN (US); Atul Shinde, Columbus, IN (US); Tony Parrish, Columbus, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 17/078,688

(22) Filed: Oct. 23, 2020

(51) Int. Cl.
*F01N 3/20* (2006.01)
*F02M 31/12* (2006.01)
*F02M 19/06* (2006.01)

(52) U.S. Cl.
CPC .......... *F01N 3/208* (2013.01); *F01N 3/2006* (2013.01); *F01N 2240/16* (2013.01); *F01N 2550/22* (2013.01); *F01N 2610/02* (2013.01); *F01N 2610/146* (2013.01); *F01N 2900/1806* (2013.01); *F02M 19/06* (2013.01); *F02M 31/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,281,570 | B2* | 10/2012 | Gierszewski | F01N 3/2066 60/286 |
| 9,404,404 | B2* | 8/2016 | Schmitt | F01N 3/2066 |
| 10,920,641 | B2* | 2/2021 | Kinnaird | B01F 3/2078 |
| 2010/0313553 | A1* | 12/2010 | Cavanagh | F01N 3/2066 60/310 |
| 2011/0266370 | A1* | 11/2011 | Roessle | F01N 3/2066 239/459 |
| 2013/0233941 | A1* | 9/2013 | Cheiky | F02M 53/06 239/133 |
| 2015/0075136 | A1* | 3/2015 | Fan | F01N 3/227 60/274 |
| 2018/0119592 | A1* | 5/2018 | Sealy | F01N 5/02 |

FOREIGN PATENT DOCUMENTS

| | | |
|---|---|---|
| DE | 102009005012 A1 | 7/2010 |
| EP | 2140117 A1 | 11/2007 |
| GB | 2568269 A | 5/2019 |
| JP | 2020139426 A | 9/2020 |
| WO | 2007124791 A1 | 11/2007 |

* cited by examiner

*Primary Examiner* — Binh Q Tran
(74) *Attorney, Agent, or Firm* — Carlson, Gaskey & Olds, P.C.

(57) ABSTRACT

An injection assembly for a vehicle exhaust system includes a housing defining a fluid cavity, a doser mounted to the housing and configured to inject a fluid into the fluid cavity, and a valve to control flow of the fluid. The valve is moveable between an open position and a closed position. A resilient member is configured with a biasing force to bias the valve to the closed position. The biasing force is overcome when fluid is heated downstream of the valve and exceeds a predetermined pressure level to allow backflow into the fluid cavity.

20 Claims, 2 Drawing Sheets

DUAL PURPOSE DOSER SPRING

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. The injection system includes a doser that sprays the fluid into the exhaust stream via an injection valve. In one example, the doser is configured to heat the DEF to a prescribed temperature. If the heater fails to shut off as commanded and the valves fail to operate, pressure can build up and an additional pressure relief valve is used to release pressure.

SUMMARY

In one exemplary embodiment, the injection system includes, among other things, a housing defining a fluid cavity, a doser mounted to the housing and configured to inject a fluid into the fluid cavity, and a valve to control flow of the fluid. The valve is moveable between an open position and a closed position. A resilient member is configured with a biasing force to bias the valve to the closed position. The biasing force is overcome when fluid is heated downstream of the valve and exceeds a predetermined pressure level to allow backflow into the fluid cavity.

In a further embodiment of the above, a heating chamber is in fluid communication with the fluid cavity and an actuator is configured to selectively open the valve such that when the valve is in the open position fluid flows between the fluid cavity and heating chamber, and when the valve is in the closed position fluid is prevented from flowing between the fluid cavity and heating chamber, and wherein the actuator opens the valve in response to an open command by overcoming the biasing force of the resilient member, and when a pressure of heated fluid in the heating chamber exceeds the predetermined pressure level, the biasing force is overcome to release the pressure.

In a further embodiment of any of the above, the resilient member comprises a coil spring having a first spring end fixed within the housing and a second spring end that is mounted for movement with an armature.

In a further embodiment of any of the above, the actuator comprises a coil that is energized in response to the open command to move the armature to compress the coil spring.

In a further embodiment of any of the above, the armature at least partially surrounds the coil spring within the fluid cavity, and wherein the coil surrounds the armature.

In a further embodiment of any of the above, a controller controls the actuator and generates the open command in response to a predetermined operating condition.

In a further embodiment of any of the above, the coil spring comprises the only spring in the housing.

In a further embodiment of any of the above, the heating chamber includes an end wall with an orifice that fluidly connects the fluid cavity and heating chamber, and including a valve seat surrounding the orifice, and wherein the valve comprises a nozzle tip that fits within the valve seat and seals the orifice when the valve is in the closed position.

In a further embodiment of any of the above, the housing defines a center axis, and wherein the housing includes a flange that extends radially outward from an outer surface of the housing relative to the center axis, and wherein one side of the flange provides a mount surface for the actuator and an opposite side of the flange provides a base wall that defines a portion of a pocket that receives an end of the heating chamber.

In a further embodiment of any of the above, a peripheral wall extends axially away from the base wall to further define the pocket, and wherein the peripheral wall surrounds the end of the heating chamber.

In a further embodiment of any of the above, the predetermined pressure level is approximately 100 bar.

In a further embodiment of any of the above, the valve comprises the only valve in the housing.

In a further embodiment of any of the above, the fluid comprises DEF and the system includes an exhaust component defining an exhaust gas flow path that receives exhaust gases from an engine, and wherein the DEF is heated within the heating chamber to a desired temperature and is injected into the exhaust gas flow path via a second valve in response to the open command.

In another exemplary embodiment, a vehicle exhaust system includes, among other things, an exhaust component defining an exhaust gas flow path that receives exhaust gases from an engine and an injection assembly that is configured to inject heated DEF into the exhaust gas flow path. The injection assembly includes a single resilient member that is configured with a biasing force to bias an injection valve to a closed position, and wherein the biasing force is overcome when commanded by heated DEF that exceeds a predetermined pressure level to allow backflow. A controller is configured to control injection of the DEF.

In another exemplary embodiment, a method includes, among other things, injecting DEF into an exhaust component defining an exhaust gas flow path that receives exhaust gases from an engine, the method further comprising the steps of: injecting heated DEF into the exhaust gas flow path with an injection assembly that includes a single resilient member; biasing an injection valve to a closed position with the single resilient member via a biasing force; and overcoming the biasing force when heated DEF exceeds a predetermined pressure level to allow backflow.

These and other features of this application will be best understood from the following specification and drawings, the following of which is a brief description.

DETAILED DESCRIPTION

Figure 1:
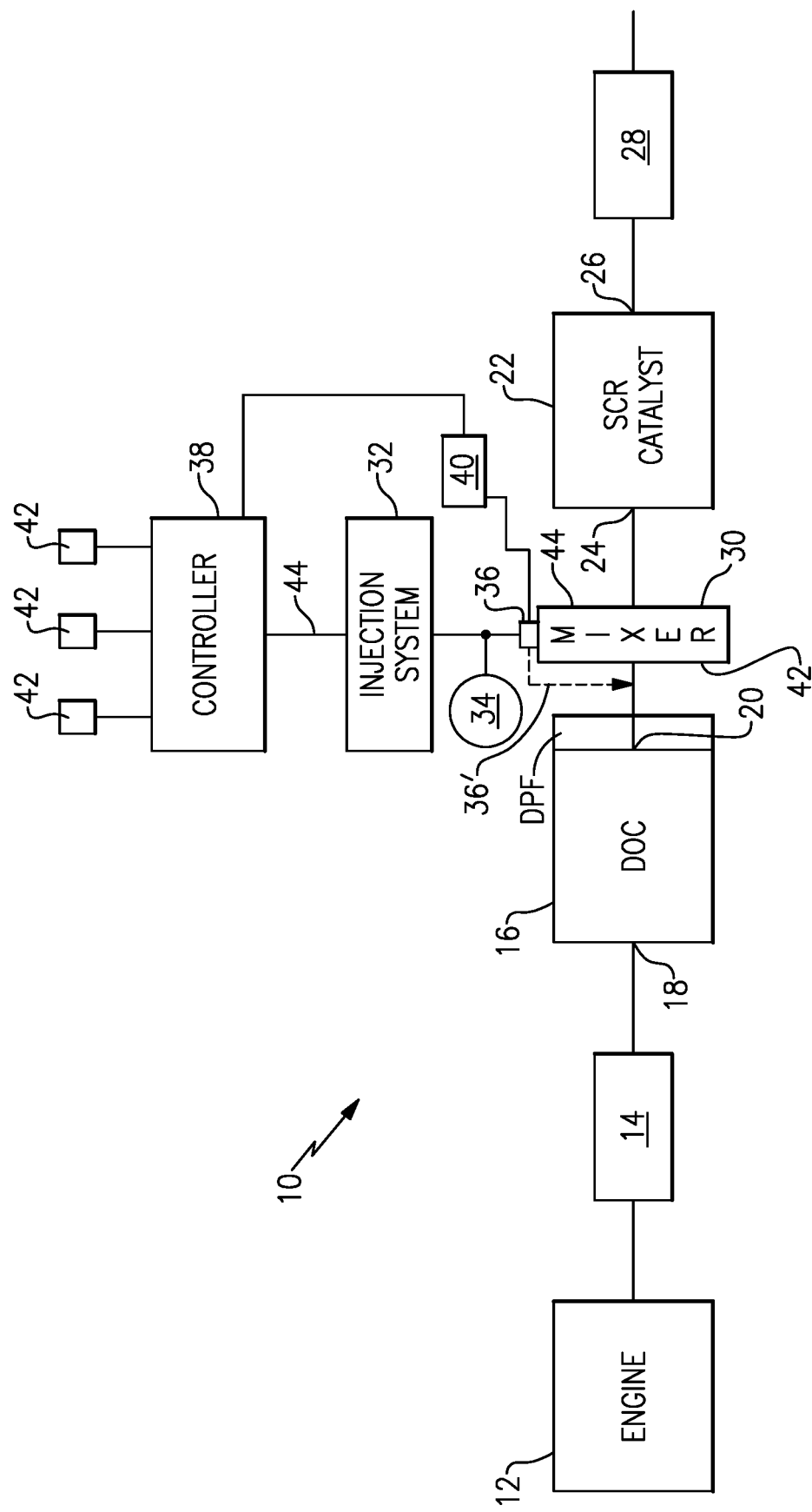
FIG. 1 schematically illustrates one example of an exhaust system with an injection system according to the subject disclosure.

FIG. 1 shows a vehicle exhaust system 10 that conducts hot exhaust gases generated by an engine 12 through various upstream exhaust components 14 to reduce emission and control noise as known. In one example configuration, the upstream exhaust component 14 comprises at least one pipe that directs engine exhaust gases into one or more exhaust gas aftertreatment components. In one example, the exhaust gas aftertreatment components include a diesel oxidation catalyst (DOC) 16 having an inlet 18 and an outlet 20, and an optional diesel particulate filter (DPF) that is used to remove contaminants from the exhaust gas as known. Downstream of the DOC 16 and optional DPF is a selective catalytic reduction (SCR) catalyst 22 having an inlet 24 and an outlet 26. The outlet 26 communicates exhaust gases to downstream exhaust components 28. Optionally, component 22 can comprise a catalyst that is configured to perform a selective catalytic reduction function and a particulate filter function. The various downstream exhaust components 28 can include one or more of the following: pipes, filters, valves, catalysts, mufflers etc. These upstream 14 and downstream 28 components can be mounted in various different configurations and combinations dependent upon vehicle application and available packaging space.

In one example, a mixer 30 is positioned downstream from the outlet 20 of the DOC 16 or DPF and upstream of the inlet 24 of the SCR catalyst 22. The upstream catalyst and downstream catalyst can be in-line or in parallel, for example. The mixer 30 is used to facilitate mixing of the exhaust gas.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. The injection system 32 includes a fluid supply tank 34, a doser 36, and a controller 38 that controls injection of the fluid as known. In one example, the doser 36 injects the DEF into the mixer 30 as shown in FIG. 1. In other examples, the doser 36 can inject the DEF into the exhaust system at other locations such as upstream of the mixer 30 as schematically indicated at 36'.

Providing ultra-low NOx emissions requires dosing at low temperatures to address de-nox at cold start and low load cycles. Dosing DEF at low temperatures raises thermolysis and deposit issues as there is usually insufficient heat from the exhaust gas to manage deposits. To address these issues, the injection system 32 heats the DEF prior to entering the mixer 30, which provides for faster atomization and better mixing. A heating element 40 is associated with the doser 36 and is used to pre-heat the DEF prior to mixing with exhaust gas. Any type of heating element 40 suitable for heating DEF can be used. Preheating of the DEF occurs in the doser 36 before the DEF is dosed/injected into the exhaust system 10. The heated DEF can be in the form of a liquid, gas, or a mixture of both.

A control system includes the controller 38 that controls heating of the DEF and/or injection of the DEF based on one or more of exhaust gas temperature, backpressure, time, and wear. Additionally, there are a plurality of sensors 42 that can be used to determine temperatures through the system, flow rates, rate of deposit formation, and wear, for example. The sensors 42 communicate data to the controller 38 such that the controller can determine when to generate a control signal 44, e.g. an open command and/or close command, that is communicated to the injection system 32.

The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing software, particularly software stored in memory. The controller 38 can be a custom made or commercially available processor, or generally any device for executing software instructions.

Figure 2:
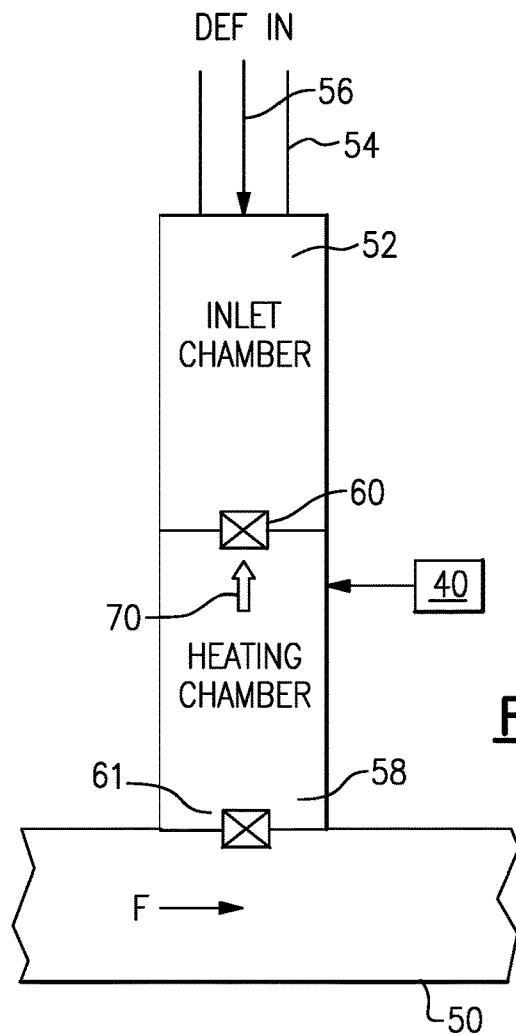
FIG. 2 is a schematic view of fluid flow within the injection system of FIG. 1.

FIG. 2 schematically shows an exhaust component 50, such as a pipe for example, which defines an exhaust gas flow path F that receives exhaust gases from the engine 12. As discussed above, the injection system 32 is configured to inject heated DEF into the exhaust gas flow path F. The injection system 32 includes an inlet chamber or fluid cavity 52 that receives the DEF through a supply line 54 as indicated at 56. The fluid cavity 52 is in fluid communication with a heating chamber 58 that receives the DEF and heats the DEF via the heating element 40 to a desired temperature before the heated DEF is injected into the exhaust component 50 via a valve 61 that is located within the heating chamber 58. Another valve 60 is used to control fluid flow between the fluid cavity 52 and the heating chamber 58. The valve 60 is configured with a dual purpose such that the valve operates to control fluid flow during normal operational conditions, while also serving as a pressure relief mechanism when heated DEF exceeds a predetermined pressure level to allow backflow into the supply line 54 and fluid supply tank 34.

Figure 3:
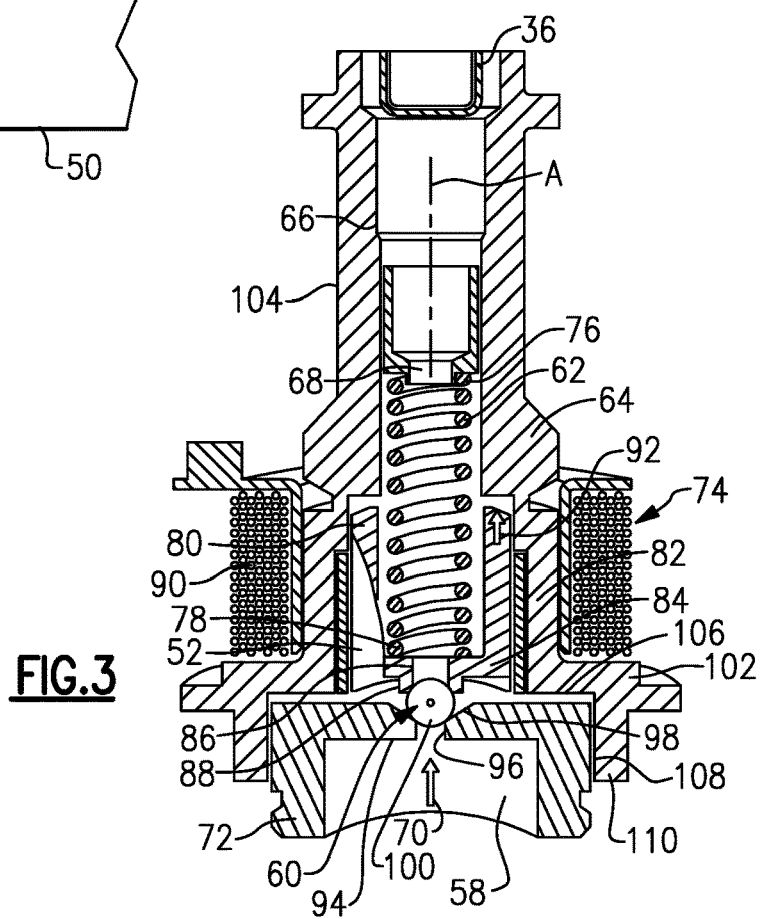
FIG. 3 is a cross-sectional side view of a doser as used in the injection system of FIG. 1.

FIG. 3 shows an example of the doser 36 and valve 60. A single resilient member 62 is configured with a predetermined biasing force to bias the valve 60 to a closed position. This biasing force is tuned such that the biasing force can be overcome when heated DEF exceeds a predetermined pressure level to allow backflow and pressure venting.

In one example, the injection assembly includes a housing 64 that defines the fluid cavity 52. The doser 36 is mounted to the housing 64 and is configured to inject DEF into the fluid cavity 52. In one example, the doser 36 includes a body that is received within a bore 66 formed in the housing 64, and which extends to a doser tip 68 that extends outwardly of the bore 66 to inject the DEF into the fluid cavity 52. The bore 66 defines a center axis A that corresponds to an injection axis. Flow out of the fluid cavity 52 is controlled by the valve 60, which is moveable between an open position and a closed position. The resilient member 62 is configured with the biasing force to bias the valve 60 to the closed position, and the biasing force is overcome when the DEF is heated and exceeds the predetermined pressure level to allow backflow into the fluid cavity 52 as indicated at 70.

A second housing 72 defines the heating chamber 58, which is in fluid communication with the fluid cavity 52 via the valve 60. An actuator 74 is configured to selectively open the valve 60 such that when the valve 60 is in the open position fluid flows between the fluid cavity 52 and heating chamber 58 and when the valve 60 is in the closed position fluid is prevented from flowing between the fluid cavity 52 and heating chamber 58. The actuator 74 opens the valve 60 in response to an open command generated by the controller 38 dependent upon vehicle operating conditions as discussed above. The actuator 74 opens the valve 60 by overcoming the biasing force of the resilient member 62. When a close command is issued or when the actuator 74 is deactivated by the controller 38, the biasing force of the resilient member 62 returns the valve 60 to the closed position. If the valve 60 fails and/or if DEF continues to be heated within the heating chamber 58, when a pressure of heated DEF in the heating chamber 58 exceeds the predetermined pressure level, the biasing force of the resilient member 62 is overcome to release the pressure and prevent any potential damage to the system.

In one example, the resilient member 62 comprises a coil spring having a first spring end 76 fixed within the housing 64 and a second spring end 78 that is mounted for movement with an armature 80. In one example, the first spring end 76 engages a portion of the housing that surrounds the tip 68 of the doser 36. In one example, the armature 80 comprises a tubular body 82 that at least partially surrounds the coil spring. The tubular body 82 fits within the fluid cavity 52 and defines an interior space that receives the second spring end 78. The tubular body 82 includes a base wall 84 that provides a seat for the second spring end 78. The base wall 84 includes an opening 86 that is configured to receive at least a portion of the valve 60. An axially extending flange 88 is formed about the opening 86.

In one example, the actuator 74 comprises a coil 90 that is energized in response to the open command to move the armature 80 to compress the coil spring. The coil 90 surrounds the armature 80. When the controller 38 activates the actuator 74 via an open command, the armature is cause to move upwardly (see 92) to compress the resilient member 62 an open the valve 60. When the controller 38 deactivates the actuator 74, power to the coil 90 is turned off and the resilient member 62 returns the valve 60 to the closed position via the armature 80. During a failure mode, when a pressure of heated DEF in the heating chamber 58 exceeds the predetermined pressure level, the biasing force of the resilient member 62 is overcome to unseat the valve 60. Thus, the valve 60 comprises the only valve in the housing 64, and the coil spring comprises the only spring in the housing 64, with the spring providing a dual function of a pressure relief feature and a closing feature for normal operation.

In one example, the second housing 72 includes an end wall 94 with an orifice 96 that fluidly connects the fluid cavity 52 and heating chamber 58. A valve seat 98 surrounds the orifice 96. In one example, the valve 60 comprises a ball or nozzle tip 100 that fits within the valve seat 98 and covers/seals the orifice 96 when the valve 60 is in the closed position. The axially extending flange 88 is pushed against the or nozzle tip 100 to force the nozzle tip against the valve seat 108 when the valve 60 is in the closed position. When the pressure in the heating chamber 58 exceeds the predetermined pressure level, the increased pressure forces the nozzle tip 100 against the axially extending flange 88 to compress the spring and open the valve 60.

In one example, the housing 64 includes a flange 102 that extends radially outward from an outer surface 104 of the housing 64 relative to the center axis A. One side of the flange 102 provides a mount surface for the coil 90 and an opposite side of the flange 102 provides a base wall 106 that defines a portion of a pocket 108 that receives an end of the second housing 72. A peripheral wall 110 extends axially away from the base wall 106 to further define the pocket 108 and surrounds the end of the second housing 72.

The subject disclosure provides for normal operation for a spring biased DEF doser 36 where the spring applies pressure to the nozzle tip 100 to close the valve 60 and seal the fluid cavity 52, and where the actuator compresses the spring to open the valve 60 to allow the DEF to be heated inside the heating chamber 58 to a prescribed temperature before being injected into the exhaust gas flow path via valve 61. If the heating element 40 fails to shut off as commanded and the valve 60/61 becomes inoperative, the same spring that is used for normal operation is also used to relieve the built up pressure within the heating chamber 58. This eliminates the need for an additional pressure relief valve in the system.

In one example, the predetermined pressure level in the heating chamber 58 is approximately 6-12 bar. The resilient member 62 is tuned to release DEF liquid and vapor pressure at 100 bar. The small volume and high pressure of DEF (~1 gram @ 100 bar) will backflow through the valve 60 and into the DEF supply line 54 or tank 34. When a liquid and gaseous mixture inside the closed heating chamber 58 reaches 300° C. it will generate approximately 100 bar of pressure. The gas is vented from the heating chamber 58 and lifts the valve spring so gas can escape into the inlet fluid chamber 52. In addition to reducing the need for the extra components needed for a pressure relief valve and an extra failure mode with the added parts, the described configuration improves packaging and reduces cost.

Although an embodiment of this disclosure has been disclosed, a worker of ordinary skill in this art would recognize that certain modifications would come within the scope of this disclosure. For that reason, the following claims should be studied to determine the true scope and content of this disclosure.

The invention claimed is:

1. An injection assembly for a vehicle exhaust system comprising:
    a housing defining a fluid cavity;
    a doser mounted to the housing, the doser configured to inject a fluid into the fluid cavity;
    a valve to control flow of the fluid, the valve being moveable between an open position and a closed position; and
    a resilient member that is configured with a biasing force to bias the valve to the closed position, and wherein the biasing force is overcome when fluid is heated downstream of the valve and exceeds a predetermined pressure level to allow backflow into the fluid cavity.

2. The injection assembly according to claim 1, including a heating chamber in fluid communication with the fluid cavity and an actuator configured to selectively open the valve such that when the valve is in the open position fluid flows between the fluid cavity and heating chamber, and when the valve is in the closed position fluid is prevented from flowing between the fluid cavity and heating chamber, and wherein the actuator opens the valve in response to an open command by overcoming the biasing force of the resilient member, and when a pressure of heated fluid in the heating chamber exceeds the predetermined pressure level, the biasing force is overcome to release the pressure.

3. The injection assembly according to claim 2, wherein the resilient member comprises a coil spring having a first spring end fixed within the housing and a second spring end that is mounted for movement with an armature.

4. The injection assembly according to claim 3, wherein the actuator comprises a coil that is energized in response to the open command to move the armature to compress the coil spring.

5. The injection assembly according to claim 4, wherein the armature at least partially surrounds the coil spring within the fluid cavity, and wherein the coil surrounds the armature.

6. The injection assembly according to claim 3, including a controller that controls the actuator and generates the open command in response to a predetermined operating condition.

7. The injection assembly according to claim 3, wherein the coil spring comprises the only spring in the housing.

8. The injection assembly according to claim 2, wherein the heating chamber includes an end wall with an orifice that fluidly connects the fluid cavity and heating chamber, and including a valve seat surrounding the orifice, and wherein the valve comprises a nozzle tip that fits within the valve seat and seals the orifice when the valve is in the closed position.

9. The injection assembly according to claim 8, wherein the housing defines a center axis, and wherein the housing includes a flange that extends radially outward from an outer surface of the housing relative to the center axis, and wherein one side of the flange provides a mount surface for the actuator and an opposite side of the flange provides a base wall that defines a portion of a pocket that receives an end of the heating chamber.

10. The injection assembly according to claim 9, including a peripheral wall extending axially away from the base wall to further define the pocket, and wherein the peripheral wall surrounds the end of the heating chamber.

11. The injection assembly according to claim 1, wherein the predetermined pressure level is approximately 100 bar.

12. The injection assembly according to claim 1, wherein the valve comprises the only valve in the housing.

13. The injection assembly according to claim 1, wherein the fluid comprises DEF and including an exhaust component defining an exhaust gas flow path that receives exhaust gases from an engine, and wherein the DEF is heated within the heating chamber to a desired temperature and is injected into the exhaust gas flow path via a second valve in response to the open command.

14. A vehicle exhaust system comprising:
an exhaust component defining an exhaust gas flow path that receives exhaust gases from an engine;
an injection assembly configured to inject heated DEF into the exhaust gas flow path, wherein the injection assembly includes a single resilient member that is configured with a biasing force to bias an injection valve to a closed position, and wherein the biasing force is overcome when commanded by heated DEF that exceeds a predetermined pressure level to allow backflow; and
a controller to control injection of the DEF.

15. The vehicle exhaust system according to claim 14, wherein the injection assembly includes
a housing defining a fluid cavity,
a doser mounted to the housing, the doser configured to inject DEF into the fluid cavity,
a heating chamber in fluid communication with the fluid cavity, and
an actuator configured to selectively open the injection valve such that when the injection valve is in an open position fluid flows between the fluid cavity and the heating chamber, and when the injection valve is in the closed position fluid is prevented from flowing between the fluid cavity and heating chamber, and wherein the actuator opens the injection valve in response to the controller generating an open command by overcoming the biasing force of the resilient member, and when a pressure of heated DEF in the heating chamber exceeds a predetermined pressure level, the biasing force is overcome to release the pressure.

16. The vehicle exhaust system according to claim 15, wherein the heating chamber includes an end wall with an orifice that fluidly connects the fluid cavity and heating chamber, and including a valve seat surrounding the orifice, and wherein the injection valve comprises a nozzle tip that fits within the valve seat and covers the orifice when the injection valve is in the closed position, and wherein the resilient member comprises a coil spring having a first spring end fixed within the housing and a second spring end that is mounted for movement with an armature, and wherein the actuator comprises a coil that is energized in response to the open command to move the armature to compress the coil spring and release the nozzle tip from sealing engagement with the valve seat.

17. The vehicle exhaust system according to claim 14, wherein the predetermined pressure level is approximately 100 bar.

18. A method for injecting DEF into an exhaust component defining an exhaust gas flow path that receives exhaust gases from an engine, the method comprising the steps of:
injecting heated DEF into the exhaust gas flow path with an injection assembly that includes a single resilient member;
biasing an injection valve to a closed position with the single resilient member via a biasing force; and
overcoming the biasing force when heated DEF exceeds a predetermined pressure level to allow backflow.

19. The method according to claim 18, wherein the predetermined pressure level is approximately 100 bar.

20. The method according to claim 18, including providing the injection assembly with
a housing defining a fluid cavity,
a doser mounted to the housing, the doser configured to inject DEF into the fluid cavity,
a heating chamber in fluid communication with the fluid cavity, wherein the heating chamber includes an end wall with an orifice that fluidly connects the fluid cavity and heating chamber, and the end wall having a valve seat surrounding the orifice, and wherein the injection valve comprises a nozzle tip that fits within the valve seat and seals the orifice when the injection valve is in the closed position, and
an actuator configured to selectively open the injection valve such that when the injection valve is in an open position fluid flows between the fluid cavity and the heating chamber, and when the injection valve is in the closed position fluid is prevented from flowing between the fluid cavity and heating chamber via sealing contact between the nozzle tip and the valve seat, and wherein the actuator opens the injection valve in response to a controller generating an open command by overcoming the biasing force of the resilient member, and when a pressure of heated DEF in the heating chamber exceeds a predetermined pressure level, the biasing force is overcome to release the pressure.

\* \* \* \* \*